G. J. KERSCHER & E. H. FORSTER.
HANDLING MECHANISM FOR BRICK MOLDS.
APPLICATION FILED AUG. 5, 1912.
1,125,557.
Patented Jan. 19, 1915.
5 SHEETS—SHEET 3.
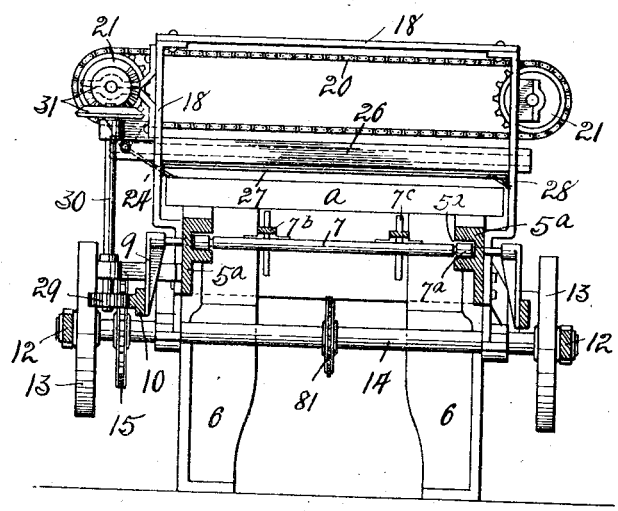
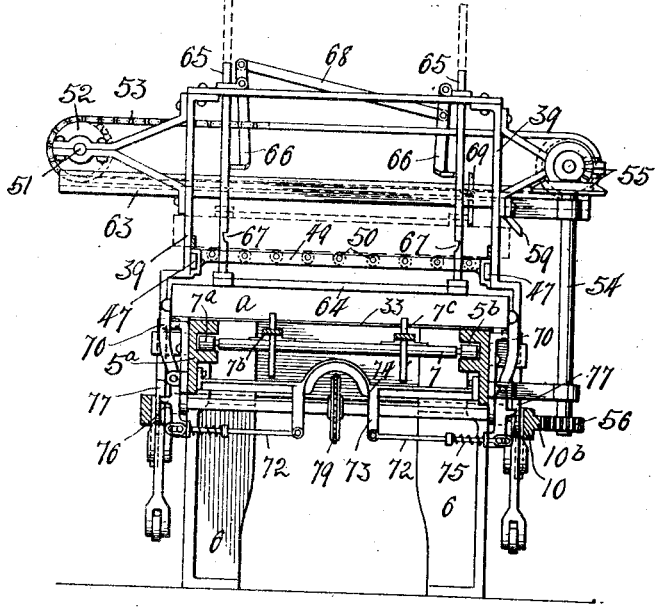

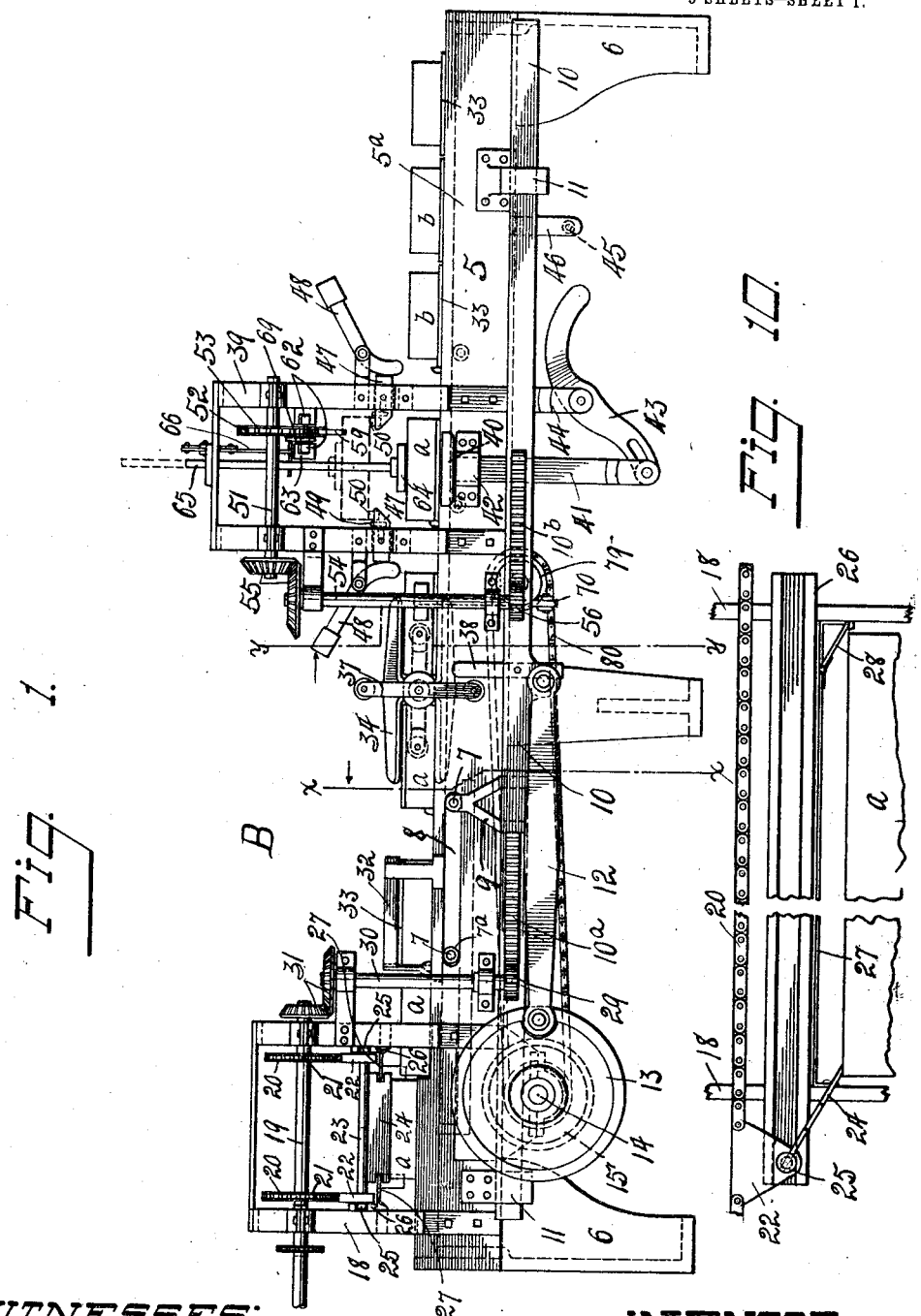

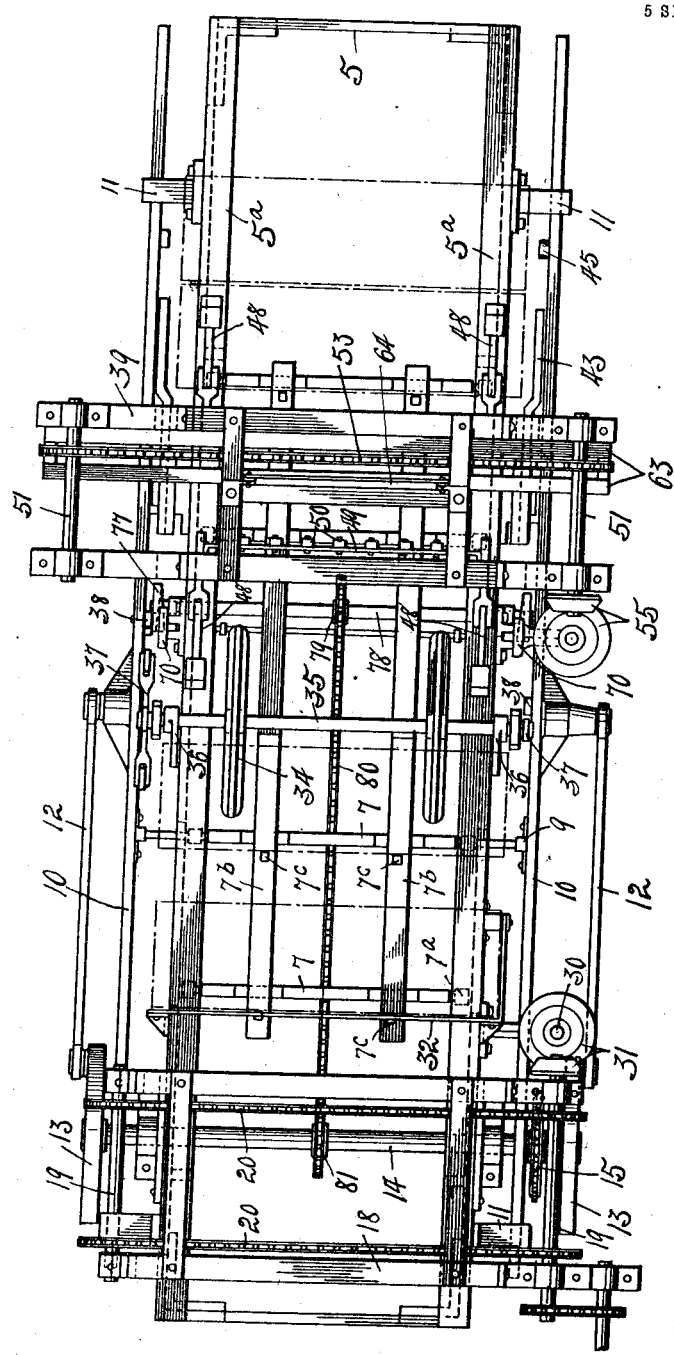

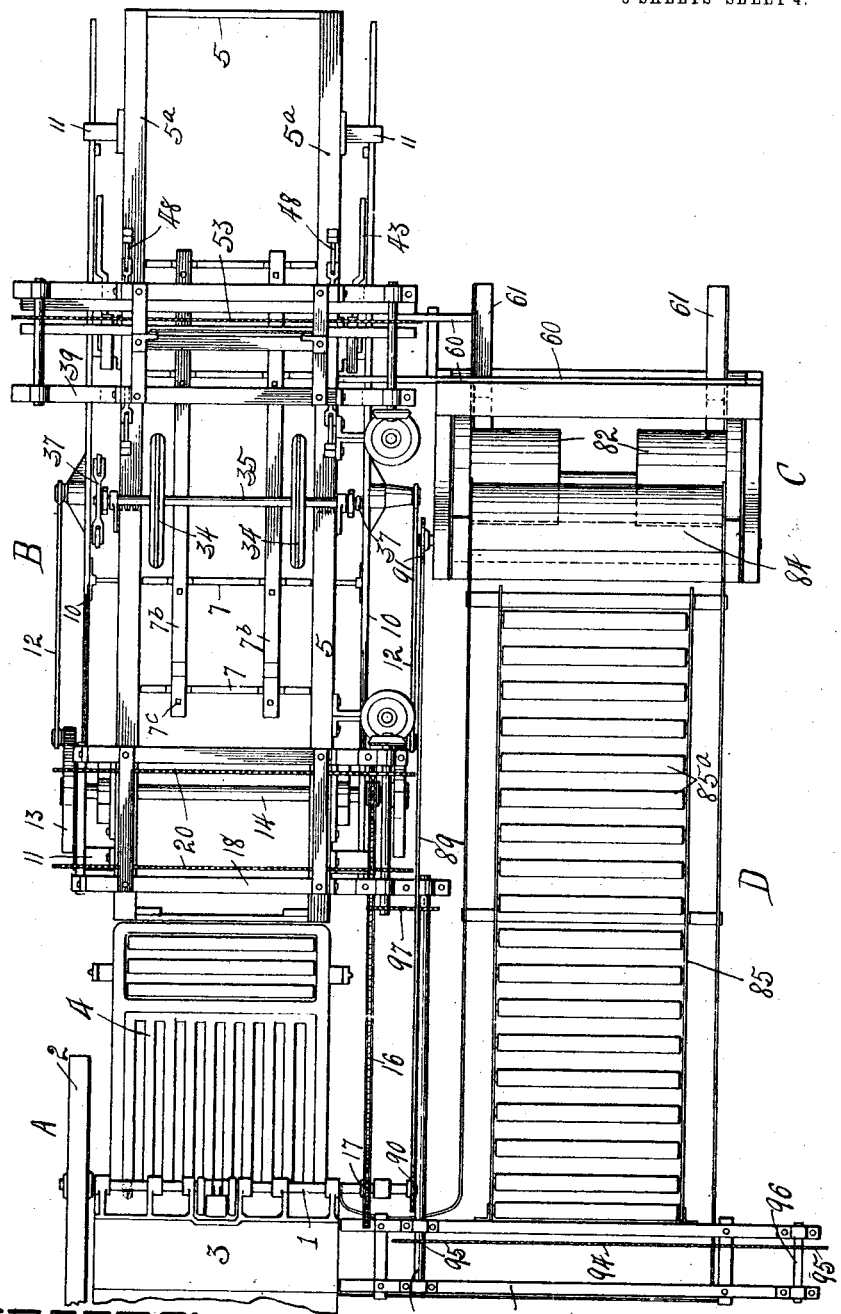

G. J. KERSCHER & E. H. FORSTER.
HANDLING MECHANISM FOR BRICK MOLDS.
APPLICATION FILED AUG. 5, 1912.
1,125,557.
Patented Jan. 19, 1915.
5 SHEETS—SHEET 5.
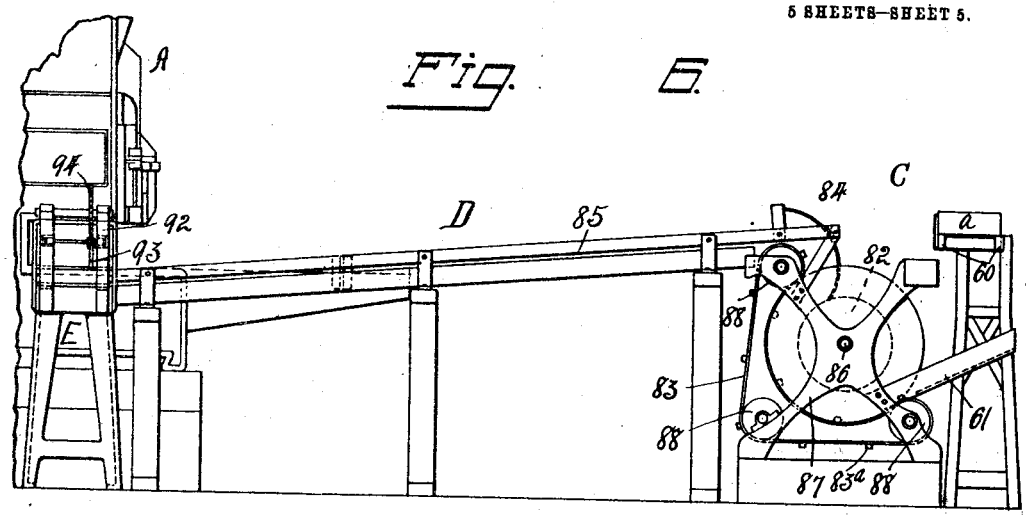
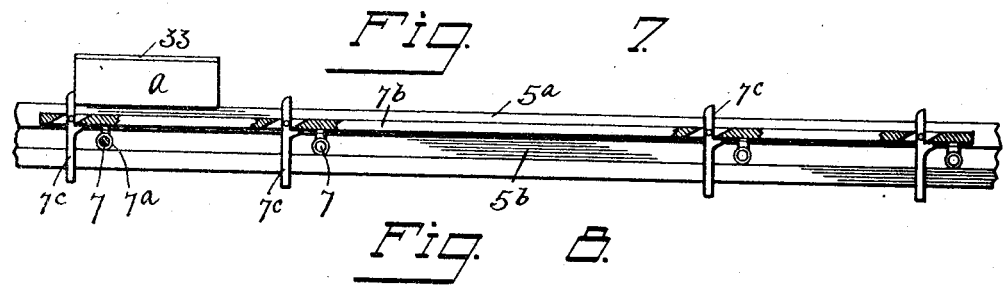
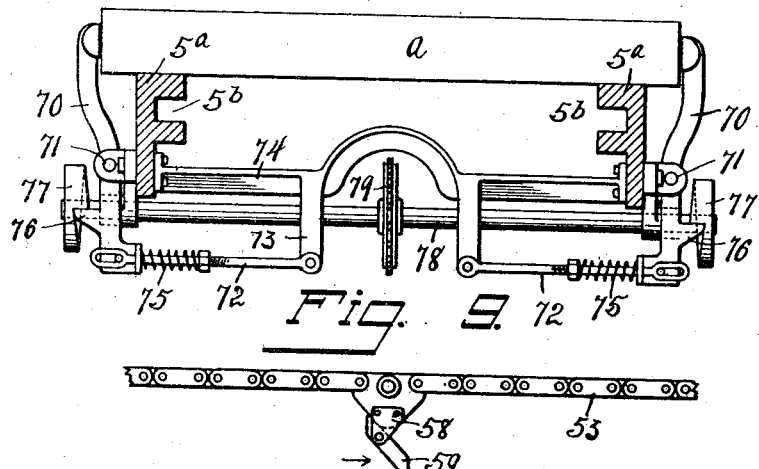
WITNESSES:
C. H. Bills.
E. E. Thomas.
INVENTOR.
George J. Kerscher,
Erle H. Forster,
By Owen & Owen,
their attys.

UNITED STATES PATENT OFFICE.

GEORGE J. KERSCHER AND ERLE H. FORSTER, OF TOLEDO, OHIO; SAID KERSCHER ASSIGNOR TO GEORGE E. MYERS, OF TOLEDO, OHIO.

HANDLING MECHANISM FOR BRICK-MOLDS.

1,125,557.  Specification of Letters Patent.  Patented Jan. 19, 1915.

Application filed August 5, 1912. Serial No. 713,433.

*To all whom it may concern:*

Be it known that we, GEORGE J. KERSCHER and ERLE H. FORSTER, citizens of the United States, and residents of Toledo, in the county of Lucas and State of Ohio, have invented a certain new and useful Handling Mechanism for Brick-Molds; and we do hereby declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to brick making machinery and particularly to machines for use in connection with soft-mud mold-filling machines for scraping the top surfaces of molds, inverting and dumping the same, and then delivering them from the machine preparatory to being sanded and returned to the mold-filling machine.

The primary object of the invention is the provision of an improved machine of the character described, which is simple and efficient in its operation and adapted to successively act upon the molds, as they are delivered thereto from the filling machine, to scrape the top surfaces thereof, place them in pallet receiving position, invert the molds, and then raise them from the molded articles, after which the molds are delivered from the machine and the molded articles are moved on the pallets to carrying-away position.

A further object of the invention is the provision in combination with a machine of this character of means which is automatically operable to knock the molds to loosen the molded articles from the walls thereof preparatory to raising the molds from such articles, thus enhancing the practicability and commercial value of machines of this class.

A further object of the invention is the provision in combination with a mold filling machine and a machine for use in conjunction therewith for scraping, inverting and dumping the molds, of means to which the molds are automatically delivered upon being dumped or freed of the molded articles, and which is adapted to sand the molds and then to return them to the filling machine preparatory to again being filled.

The invention is fully described in the following specification, and while, in its broader aspect, it is capable of embodiment in numerous forms, a preferred embodiment thereof is illustrated in the accompanying drawings, in which,—

Figure 1 is a side elevation of the mold scraping, inverting, dumping and off-bearing unit of the invention. Fig. 2 is a top plan view thereof. Figs. 3 and 4 are cross-sections thereof on the lines x, x and y, y in Fig. 1. Fig. 5 is a plan of the several connected units of the invention with only the forward end portion of the mold-filling unit shown. Fig. 6 is a side elevation of the parts which right the molds after being dumped and then return them to the filling machine, a part only of the latter being shown. Fig. 7 is a detail of the mold moving carriage with parts broken away. Fig. 8 is an enlarged detail of the mold-end striking mechanism. Fig. 9 is an enlarged section of the mold off-bearing chain with the mold engaging finger attached thereto, and Fig. 10 is an enlarged detail of the mold scraping mechanism.

Referring to the drawings, A designates a soft-mud or mold-filling machine; B the automatic mold reversing, dumping and off-bearing machine; C the machine to which the empty molds are delivered from the machine B and in which the sanding of the molds occurs, and D an inclined way down which the sanded molds pass by gravity to a mechanism E by which they are then delivered in filling position to the filling machine A.

The machine or unit A, which may be of any suitable construction, numerous forms of which are on the market, is shown, in the present instance, as having a crank-shaft 1 to which the customary tamping plunger, not shown, is attached and which carries a drive pulley 2. This shaft is intended to make a single revolution at each cycle or mold-filling operation of the filling machine. The empty molds are successively inserted into the filling portion 3 of the machine, and upon being filled are automatically moved forward to tamping position by any suitable means provided in this class of machines for such purposes, the rear mold pushing the preceding molds forward onto the table 4 and then into trimming or scraping position on the rear end of the machine unit B. As the construction of the machine A forms no part of the present invention and is well understood in the art a portion only of such machine is shown to illustrate the use of the other units in connection therewith.

The machine or unit B, in which the major features of our invention reside, embodies a rectangular frame 5, which is supported by legs 6 and has its side members or beams 5ª, 5ª provided longitudinally on their inner sides with race-ways or grooves 5ᵇ in which the antifriction rollers of a mold moving carriage or member are mounted for reciprocatory movements longitudinally of the frame. This carriage or member is shown, in the present instance, as comprising a plurality of cross-bars 7, which carry rollers 7ª at their ends for working in the respective race-ways 5ᵇ, and are rigidly spaced apart by a pair of laterally spaced longitudinal bars 7ᵇ, which are secured to the cross-bars in any suitable manner. The bars 7ᵇ are each provided at suitable intervals with pivoted mold moving fingers 7ᶜ, which normally stand in vertical positions and are adapted to have pivotal movements from a vertical in one direction but not in the other, whereby upon a forward movement of the carriage such fingers will coact with the rear sides of registering molds $a$ to move such molds forward with the carriage, and upon a rearward or return movement of the carriage will be tilted from vertical position by contact with the molds to permit them to pass thereunder to the rear sides thereof. It is therefore apparent that the carriage 7—7ᵇ serves to move the molds step by step toward the front or right-hand end of the machine, the molds sliding on the top sides of the frame beams 5ª during such movements, and to pass back under the molds without moving the same and into position for the fingers 7ᶜ thereof to act against the rear sides of the respective molds to be next moved thereby, as will be hereinafter more fully explained.

One of the cross-bars 7 of the mold moving carriage has its ends projected through slots 8 in the frame sides and attached without such sides to arms or standards 9, which rise from push-bars 10 that are mounted for horizontal reciprocatory movements at the respective sides of the frame 5 by guides 11 attached to the frame. These bars are connected by pitmans 12 to crank-pins on wheels 13 which are mounted on a shaft 14 at the respective sides of the rear end portion of the frame 5. The shaft 14 is journaled in suitable bearings transversely of the lower rear end portion of the frame 5 and has a sprocket-wheel 15 in connection, through a chain 16, with a sprocket-wheel 17 on the shaft 1 of the mold-filling unit A, as shown in Fig. 5, the connection between the two shafts 1 and 14 being such that the shaft 14 will have a complete revolution for each revolution of the shaft 1. It is thus evident that the mold moving carriage 7—7ᵇ has complete forward and rearward strokes for each revolution of the shaft.

The rear end of the frame 5 has an elevated table portion 5ᶜ, and rising from the frame over this portion is an inverted U-shaped frame work 18 which carries at the opposite end portions thereof the parallel longitudinally disposed shafts 19, 19 which are connected by a pair of sprocket-chains 20 operating over equal sized sprocket-wheels 21 thereon. The sprocket-chains 20 operate transversely of the frame 5, and have hanger-plates 22 depending from their under sides in registering relation longitudinally of the machine. The ends of a shaft 23 are pivotally mounted in these plates, and such shaft has a scraper-plate 24 depending therefrom for operating over the top of a subjacent mold $a$ to scrape and level the top or exposed surfaces of the molded brick therein. The sprocket-chains 20 have reciprocal movements intermittently imparted thereto, in the manner hereinafter described, so that the scraper will alternately move in opposite directions the full length of a subjacent mold. The ends of the scraper-shaft 23 project without the hanger-plates 22 and are provided with rollers 25, which travel in race-ways or grooves on the inner sides of bars 26, which are attached to the frame 18, thus holding the scraper steady during the reciprocatory movements thereof.

In order that the scraper 24 may have scraping contact with a mold surface in only one direction of movement thereof, the ends of the scraper are notched to receive the inner edges of guide-flanges 27 when the scraper is moving across a mold to scrape the same. The forward end of each flange 27 is provided with a hinged member 28 which normally hangs down by gravity in the inclined position shown in Figs. 3 and 10, so that when the notches of the scraper have passed beyond the ends of such members, said members will drop down and cause the lower edge of the scraper to ride over the tops of the guide-flanges 27 on its rearward or return movement free from contact with the top of the mold.

Reciprocatory movements are communicated to the sprocket chains 20, 20 from the reciprocatory movements of one of the bars 10 by a suitable intermediate gearing between a series of rack teeth 10ª on such bar and one of the shafts 19. This gearing comprises a pinion 29 in mesh with the rack teeth 10ª, said pinion being carried by a vertical shaft 30, which is journaled in suitable bearings at one side of the frames 5 and 18, and has connection with one of the shafts 19 through a set of bevel-gears 31. It is thus evident that the scraper 24 makes a forward and a backward stroke at each revolution of the shaft 14, the gearing being so proportioned that the scraper will move entirely across a subjacent mold at each stroke.

The filled molds $a$ are successively moved onto the rear end of the frame 5 and beneath the path of movement of the scraper 24 by the pushing action of the succeeding molds, as above stated, and after being scraped are pushed from the elevated rear frame end $5^c$ onto the lowered plane of the frame top as best shown in Fig. 1. At the next forward movement of the molds, the mold which was previously moved from under the scraper 24 is moved under a frame 32, which rises from the frame 5 and serves as a guide for facilitating the placing of the pallets 33 on the top or open sides of the molds, such movement being accomplished on the forward movement of the carriage $7-7^b$ by reason of the rear set of fingers $7^c$ engaging the rear side of the mold. On the next forward stroke of the carriage $7-7^b$ the second set of fingers $7^c$ engages the rear side of the mold upon which the pallet has just been placed and moves such mold with the pallet thereon into the registering receiving mouths or sockets of a plurality of mold inverting arms 34, which are carried by and projected in opposite directions from a shaft 35 that is disposed in the path of movement of the molds over the frame top and has its ends journaled in suitable bearings 36 rising from the frame sides. The arms 34 have like mold receiving sockets at opposite sides of the shaft and are intended to have a half revolution communicated thereto at each rear stroke of the push bars 10 so as to place the mold which was moved into the rearwardly projecting arms thereof in inverted position at the front side of the shaft 35 and to place the oppositely projecting arms into mold receiving position.

Each end of the shaft 35 is provided without its bearing with a wiper-member 37, which is in the form of a cross-arm with the two arms thereof projecting in opposite directions from the shaft, the wiper-members at the opposite ends of the shaft being disposed at right angles to each other. Each of the push bars 10 carries a normal vertically projecting pivoted finger 38 at its inner side in position for its upper end to contact with an end of a registering wiper-member 37 at a predetermined point in a rearward movement of the associated bar, whereby to impart a quarter of a revolution to the shaft 35. The fingers 38 are pivoted to the respective bars 10 and act against registering lugs or parts thereof below their pivots in such manner as to cause the fingers on their rearward movements to act on the wiper-members to turn the same, and on their forward movements to turn on their pivots to permit them to pass under the end of a registering wiper-member without turning the same. The fingers 38 on the two bars 10, 10 are so relatively disposed that first one and then the other acts on its wiper-member, whereby they coöperate to impart a half revolution to the shaft 35 and mold inverting arms 34.

Upon the next forward movement of the carriage $7-7^b$, after the inverting of a mold, the third set of fingers $7^c$ thereof engages the rear side of the inverted mold and moves it together with the subjacent pallet into mold dumping position beneath the frame 39, which frame rises from and extends transversely over the frame 5. Upon the next rearward movement of the carriage $7-7^b$ the vertically movable mold lifting plungers 40 are raised to lift the molds $a$ from the brick or other articles $b$ disposed therein, the plungers 40 engaging the lower end edges of the molds without the ends of the pallets 33 for such purpose. The plungers 40, one of which is disposed at each side of the frame 5, have their guide rods 41 mounted for vertical reciprocatory movements in guides 42 attached to the frame sides, and each of such rods has its lower ends in pin and slot connection with one arm of a lever 43; which extends longitudinally of the frame 5 and has its fulcrum in a hanger arm 44 depending from the adjacent side of such frame. The forward arm of each lever 43 is disposed in the path of movement of a roller 45 which is carried by an arm 46 projecting downwardly from the forward end portion of the associated push bar 10, and is so curved or shaped that as the roller 45 moves thereon, upon each rearward stroke of the bar 10, the associated plunger 40 will be raised to lift the mold a predetermined height.

Each of the four front and rear end standards of the frame 39 has a slide-finger 47 attached thereto below the elevated plane of a mold, such fingers having their sliding movements in directions longitudinally of the frame $b$ and being normally held in inwardly projected positions relative to the frame 39 by weighted levers 48, as shown in Figs. 1, 4 and 5. The slide-fingers 47 which are disposed at the same side of the frame 39, are connected adjacent to their inner ends by a bar 49, which carries a plurality of rollers 50 on its inner side upon which the associated side edge of an elevated mold rests when being moved laterally from the machine, as hereinafter described. The lower inner end edges of the fingers 47 are beveled or tapered so that the contact of the upper side edges of a mold therewith when being raised will move such fingers and the associated bars 49 and rolls 50 outward to permit a raising of the mold above the same. As soon as a mold has been raised above the rollers 50 they will be moved inward under the side edges of the mold by the influence of the weighted levers 48 or other suitable means so that the mold will rest upon such rollers when the plungers 40 are lowered.

A shaft 51 is mounted in the upper portion of the frame 39 at each end thereof, and these shafts carry sprocket-wheels 52 which are connected by a sprocket-chain 53. A vertical shaft 54, which is journaled in suitable bearings at one side of the frame 5, has its upper end in driving connection with one of the shafts 51 through a set of beveled-gears 55, and carries a pinion 56 on its lower end in mesh with a series of rack-teeth 10$^b$ on the adjacent push-bar 10, so that reciprocatory movements are communicated to the chain 53 from the reciprocatory movements of said push-bar. The chain 53 has a plate 58 depending from the lower portion thereof to which is pivotally attached a mold pushing finger 59. This finger, as best shown in Fig. 9, is adapted to engage an end of a mold and to move it therewith laterally of the machine when moving in the direction indicated by the arrow in Fig. 9, and when moving in the opposite direction, or returning to mold engaging position, is adapted to turn on its pivot to permit it to pass freely over a mold. The chain 53 is so geared to the push-bar 10 that the mold delivering stroke of the finger 59 will be sufficient to move a mold from over the rollers 50 and onto a track 60 at the mold delivering side of the machine. The outer end of the forward one of the rails of the track 60 is made shorter than the other so that when a mold has been moved to the end of the short rail the forward edge thereof will first drop by gravity to cause a half turning of the mold when dropping into subjacent inclined guide members 61, which deliver the mold in righted position to the sanding machine, as hereinafter more fully described. The chain-plate 58 is provided at its sides with rollers 62 which travel in the registering grooves of guide-bars 63 to hold such plate steady in its horizontal reciprocatory movement, as best shown in Figs. 1, 2 and 4.

A knocker-head 64 is carried above a mold when in dumping position by vertical rods 65, 65 which pass upward from the head through registering guides in the frame 39 and is held in suspended relation relative to a mold which has just passed within the frame 39 by catch-levers 66, one of which is pivoted to the upper portion of the frame adjacent to each rod and has its lower end bent to adapt it to project into a notch 67 in the associated rod, whereby to hold the rod in elevated position. The levers 66, 66 are pivotally connected at opposite sides of their fulcrums by a bar 68, which causes the catch ends of such levers to have inward or outward movements in unison. The chain 53 carries at one side thereof a pivoted finger 69 which when the chain has started on its return stroke after delivering a mold from the machine, strikes the lower end of the adjacent catch-levers 66 and effects a movement of it together with its companion from engagement with the respective notches 67 in the rods 65, thus permitting the knocker-head 64 to drop by gravity upon the upturned bottom of a subjacent mold. The striking of a mold bottom by the knocker-head 64 is timed to take place as soon as the mold is raised slightly by the raising plungers so that any of the molded articles which adhere to the mold will be loosened therefrom and permitted to drop onto the subjacent pallet. The trip finger 69 is attached to a side of the lower portion of the chain 53 in a suitable manner to cause it to engage a registering portion of one of the levers 66 and trip such lever on a movement of the chain in one direction, and to pass freely under such portion of the lever upon a movement of the chain in the other direction. It is also preferable to provide means for knocking the ends of the molds before entering the frame 39 to assist in loosening the molded articles from the walls of the mold. This is shown in the present instance as being accomplished by the provision of a pair of knocker-levers 70, 70, which are pivoted to opposite sides of the frame 5, as at 71, 71, and have their upper ends disposed in position to strike the ends of a mold immediately after it is inverted by the arms 34. The lower ends of the levers 70 project below the respective side beams of the frame and are connected by rods 72 to ungers 73 projecting downward from a cross-bar 74 of the frame. The levers 70 are adapted to have limited movements relative to the rods 72 and their lower ends are yieldingly pressed outward by springs 75 on said rods, as best shown in Fig. 8. Each lever has a stud 76 projecting laterally from its lower end portion and working against the cam side of a disk 77, which is mounted on the associated end of a cross-shaft 78 that is journaled below the frame 5. The cam surfaces of the disks 77, 77 are such that at each revolution of the shaft the upper ends of the levers 70 will be retracted from the ends of a mold and will then be suddenly released to permit the upper ends of the lever arms to strike the ends of the mold, the striking action being imparted thereto by the springs 75. The shaft 78 has a sprocket wheel 79 thereon which has connection through a chain 80 with a like sized sprocket wheel 81 on the shaft 14 whereby a revolution will be imparted to the shaft 78 at each revolution of the shaft 14.

Upon the next forward movement of the carriage 7—7ᵇ after the raising of a mold from the molded articles, the forward set of fingers 7ᶜ coact with the rear edge of the pallet within the frame 39 and move it with the molded articles thereon forward from the frame 39 to carrying away position.

When an empty mold has been dumped in righted position upon the inclined guide members 61, which are disposed below the extended track-rail 60, it is guided by such members into a drum 82 and carried around such drum to the upper side thereof by an endless apron 83. When a mold has reached the top of the drum it is guided by a curved guide plate 84 onto a declining way 85 down which it passes by gravity, such way being provided with a plurality of rolls 85ᵃ to facilitate the downward movement of molds thereon. The drum 82 is mounted on a shaft 86, 86 that is journaled in suitable end standards 87 and has its ends peripherally flanged to maintain the apron 83 in spaced relation to the drum proper, such apron having contact with the drum flanges, as shown in Fig. 6. The apron 83 is guided by idler rolls 88 so that one side of the apron envelops approximately one-half of the drum. The apron has spaced bars or cleats 83ᵃ disposed transversely thereof and these serve to deliver the molds around the drum to the way 85. The apron is shown as being driven in the present instance from the shaft 1 by a chain 89, which passes over a sprocket-wheel 90 on said shaft and a sprocket-wheel 91 on the shaft of the upper roll 88.

The mechanism E by which the empty molds are delivered from the lower end of the way 85 into filling position in the filling machine A, comprises an inclined slide frame 92, which guides the endwise movements of the molds to the machine A, such movements being communicated to the molds by a finger 93 on the lower portion of a reciprocally movable sprocket-chain 94. This sprocket-chain passes over sprocket-wheels 95 on shafts 96, 96 at opposite ends of the slide frame 92, and the inner one of such shafts is extended to a bearing on a laterally projected portion of the frame 18 of the unit B and has sprocket and chain connection 97 with the adjacent shaft 19, which is journaled in said frame. It is thus evident that the sprocket chain 94 has properly timed reciprocatory movements imparted thereto from one of the reciprocatory bars 10 through the medium of the gearing which drives the scraper chain 20.

From the above description it will be apparent that in the operation of the machine, the molds have an endless chain movement around the different connected units of the apparatus, and that as the empty molds are delivered to the filling machine they are intermittently filled and forced onto the rear end of the frame 5 of the unit B in position to be scraped by the scraper 24, which scraping occurs during the forward strokes of the bars 10. It is also evident that upon the forward stroke of the bars 10, the carriage 7—7ᵇ moves the mold, which was previously scraped, into pallet receiving position, moves the mold with a pallet thereon into reversing position, moves the mold which was previously reversed into dumping position and moves the pallet and previously dumped molded articles forward to carrying away position. When a mold which has been moved into the rear open ends of the cross-arms 34 of the inverting means has been inverted by a half revolution of such arms, which occurs on a rearward stroke of the bars 10, the knocker-levers 70 then strike the inverted mold to loosen the molded articles from the walls thereof, and when a mold starts to raise within the frame 39 the knocker 64 drops on the upturned bottom thereof to insure a releasing of all of the molded articles therefrom. The emptied mold having been raised into position to rest upon the rollers 50, which occurs on a rearward stroke of the bars 10, it is then on the next forward stroke delivered laterally from the unit B by the finger 59 on the chain 53. When the mold has reached the limit of its outward movement relative to the unit B the forward side thereof passes from the forward rail of the track 60, thus permitting such side of the mold to first lower so that the mold receives a half turn in its fall upon the guide members 61, thus delivering it in righted position to the drum 82. When the mold is passing around the drum 82 sand is discharged thereto in any suitable manner, as well understood in the art, so as to sand the walls of the mold to prevent the brick, which are subsequently molded therein, from sticking thereto when being dumped. The mold having been delivered to the drum 82 the cleated apron 83 carries the same around the drum and delivers it to the upper end of the inclined way 85 down which the mold then passes by gravity to the mechanism E by which it is delivered to the filling machine to be again filled.

We wish it understood that this invention is not limited to any specific construction or arrangement of the parts except in so far as such limitations are specified in the claims, or to the use of all of the units in combination, as they may be operated separately if desired.

Having thus described our invention, what we claim as new and desire to secure by Letters Patent, is,—

1. In a machine of the class described, a frame, a superposed part, a mold knocking member guided for movements by said part, catch means for suspending said member in elevated position above the frame, and means operable to trip such catch member at predetermined intervals to release the knocking member to permit it to drop by gravity upon a subjacent mold.

2. In a machine of the class described, a frame, a part rising therefrom, mold striking means guided for movements by said part, catch means for suspending said striking means in elevated position relative to the frame, means operable to move an elevated mold from over the frame, and having a part which acts to trip said catch means at predetermined intervals.

In testimony whereof, we have hereunto signed our names to this specification in the presence of two subscribing witnesses.

GEORGE J. KERSCHER.
ERLE H. FORSTER.

Witnesses:
C. W. OWEN,
E. E. THOMAS.